US011960276B2

(12) United States Patent
Qian et al.

(10) Patent No.: US 11,960,276 B2
(45) Date of Patent: Apr. 16, 2024

(54) MULTI-SENSOR COLLABORATIVE CALIBRATION SYSTEM

(71) Applicant: TUSIMPLE, INC., San Diego, CA (US)

(72) Inventors: Chenzhe Qian, San Diego, CA (US); Chenghao Gong, San Diego, CA (US); Fuheng Deng, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 738 days.

(21) Appl. No.: 16/953,089

(22) Filed: Nov. 19, 2020

(65) Prior Publication Data
US 2022/0155776 A1    May 19, 2022

(51) Int. Cl.
  *G01S 17/931*   (2020.01)
  *G01C 25/00*    (2006.01)
  *G01S 7/497*    (2006.01)
  *G01S 13/86*    (2006.01)
  *G05D 1/00*     (2006.01)

(52) U.S. Cl.
  CPC ......... *G05D 1/0011* (2013.01); *G01C 25/005* (2013.01); *G01S 7/497* (2013.01); *G01S 13/865* (2013.01); *G01S 17/931* (2020.01)

(58) Field of Classification Search
  CPC ...... G01S 17/931; G01S 7/497; G01S 13/865; G01C 25/005
  USPC ....................................................... 701/33.1
  See application file for complete search history.

(56) References Cited

U.S. PATENT DOCUMENTS

| 7,840,352 | B2  |   | 11/2010 | Strelow et al. |
| 9,201,424 | B1  | * | 12/2015 | Ogale ..................... G06T 7/80 |
| 9,563,951 | B2  | * | 2/2017  | Okouneva ............ H04N 17/002 |
| 10,298,910 | B1 | * | 5/2019  | Kroeger ................... G06T 7/85 |
| 10,724,865 | B1 |   | 7/2020  | Ferguson et al. |

(Continued)

FOREIGN PATENT DOCUMENTS

| CN | 112180362 A | 1/2021 |
| EP | 3671643 A1  | 6/2020 |

OTHER PUBLICATIONS

Walters et al., A Robust Extrinsic Calibration Framework for Vehicles with Unscaled Sensors, Published 2019 via IEEE, pp. 36-42.*

(Continued)

*Primary Examiner* — Manglesh M Patel
(74) *Attorney, Agent, or Firm* — Perkins Coie LLP

(57) ABSTRACT

An example method for performing multi-sensor collaborative calibration on a vehicle includes obtaining, from at least two sensors located on a vehicle, sensor data items of an area that comprises a plurality of calibration objects; determining, from the sensor data items, attributes of the plurality of calibration objects; determining, for the at least two sensors, an initial matrix that describes a first set of extrinsic parameters between the at least two sensors based at least on the attributes of the plurality of calibration objects; determining an updated matrix that describes a second set of extrinsic parameters between the at least two sensors based at least on the initial matrix and a location of at least one calibration object; and performing autonomous operation of the vehicle using the second set of extrinsic parameters and additional sensor data received from the at least two sensors.

19 Claims, 7 Drawing Sheets

(56) References Cited

U.S. PATENT DOCUMENTS

| | | | |
|---|---|---|---|
| 10,726,579 B1 | 7/2020 | Huang | |
| 10,742,969 B1* | 8/2020 | Rohatgi | H04N 17/002 |
| 10,785,474 B1* | 9/2020 | Semansky | G06V 20/56 |
| 11,048,277 B1* | 6/2021 | Zhu | G06T 7/251 |
| 11,829,139 B2* | 11/2023 | Jobanputra | G06F 9/547 |
| 2010/0164807 A1 | 7/2010 | Tseng et al. | |
| 2010/0235129 A1 | 9/2010 | Sharma et al. | |
| 2012/0320190 A1* | 12/2012 | Natroshvili | G06T 7/85 348/135 |
| 2013/0030811 A1 | 1/2013 | Olleon et al. | |
| 2014/0139674 A1 | 5/2014 | Aoki et al. | |
| 2014/0247354 A1* | 9/2014 | Knudsen | G06T 7/85 348/148 |
| 2014/0294231 A1 | 10/2014 | Datta et al. | |
| 2016/0275683 A1 | 9/2016 | Sakano et al. | |
| 2017/0124781 A1 | 5/2017 | Douillard et al. | |
| 2018/0158197 A1* | 6/2018 | Dasgupta | H04N 13/243 |
| 2018/0197310 A1* | 7/2018 | Singh | G06T 5/006 |
| 2018/0281698 A1* | 10/2018 | Tang | G06T 7/80 |
| 2018/0284243 A1* | 10/2018 | Wood | G05D 1/0234 |
| 2018/0292818 A1 | 10/2018 | Gariepy et al. | |
| 2019/0012808 A1 | 1/2019 | Mou | |
| 2019/0049566 A1 | 2/2019 | Adams et al. | |
| 2019/0063945 A1 | 2/2019 | Liu et al. | |
| 2019/0065863 A1 | 2/2019 | Luo et al. | |
| 2019/0071094 A1 | 3/2019 | Nishiguchi et al. | |
| 2019/0113608 A1* | 4/2019 | Mills | G06T 7/80 |
| 2019/0204425 A1* | 7/2019 | Abari | G01S 7/497 |
| 2019/0204427 A1* | 7/2019 | Abari | G01S 17/86 |
| 2019/0248487 A1* | 8/2019 | Holtz | G06V 10/764 |
| 2019/0250601 A1* | 8/2019 | Donahoe | G06F 3/0482 |
| 2019/0250640 A1* | 8/2019 | O'Flaherty | B64U 10/14 |
| 2019/0377345 A1* | 12/2019 | Bachrach | G05D 1/0088 |
| 2019/0378423 A1* | 12/2019 | Bachrach | H04L 67/52 |
| 2020/0005489 A1* | 1/2020 | Kroeger | G06T 7/85 |
| 2020/0018852 A1 | 1/2020 | Walls et al. | |
| 2020/0073385 A1* | 3/2020 | Jobanputra | G06F 8/20 |
| 2020/0088858 A1* | 3/2020 | Li | G06T 7/80 |
| 2020/0089971 A1* | 3/2020 | Li | G01S 7/4972 |
| 2020/0174107 A1 | 6/2020 | Briggs et al. | |
| 2020/0226768 A1 | 7/2020 | Lombardi | |
| 2020/0226790 A1 | 7/2020 | Alvarez et al. | |
| 2020/0264625 A1* | 8/2020 | Estep | G06Q 10/08 |
| 2020/0300637 A1* | 9/2020 | Chiu | G05D 1/0253 |
| 2020/0334861 A1* | 10/2020 | Jin | G06T 7/85 |
| 2020/0349738 A1* | 11/2020 | Kamma | G06T 7/85 |
| 2020/0410715 A1* | 12/2020 | Cadien | G01S 13/867 |
| 2021/0192788 A1 | 6/2021 | Diederichs et al. | |
| 2021/0215505 A1* | 7/2021 | Castorena Martinez | G01D 18/00 |
| 2021/0383570 A1 | 12/2021 | Cai | |
| 2022/0066002 A1* | 3/2022 | Abari | G01S 17/10 |
| 2022/0299592 A1* | 9/2022 | Chiu | G05D 1/0272 |
| 2023/0027622 A1* | 1/2023 | Haeusler | H04N 17/002 |

OTHER PUBLICATIONS

Reinke et al., A Factor Graph Approach to Multi-Camera Extrinsic Calibration on Legged Robots, Published 2019 IEEE, pp. 391-394.*

Dellaert, F. et al., "Factor Graphs for Robot Perception," Foundations and Trends® in Robotics, 6(1-2), pp. 1-139, 2017, available at https://www.cc.gatech.edu/~dellaert/pubs/Dellaert17fnt.pdf.

"Factor Graphs and GTSAM," GTSAM, available at https://gtsam.org/tutorials/intro.html.

Forster, C. et al., "IMU Preintegration on Manifold for Efficient Visual-Inertial Maximum-a-Posteriori Estimation," available at https://smartech.gatech.edu/bitstream/handle/1853/55417/IMU%20Preintegration%20on%20Manifold%20for%20Efficient.pdf?sequence=1&isAllowed=y.

Forster, C. et al., "On-Manifold Preintegration for Real-Time Visual-Inertial Odometry," IEEE Transactions on Robotics, 2016, available at https://arxiv.org/pdf/1512.02363.pdf.

Dong, J. et al., "Motion Planning as Probabilistic Inference using Gaussian Processes and Factor Graphs," Institute for Robotics & Intelligent Machines, Robotics: Science and Systems, vol. 12, available at https://homes.cs.washington.edu/~bboots/files/GPMP2.pdf.

U.S. Patent & Trademark Office, Notice of Allowance for U.S. Appl. No. 17/150,271, dated Mar. 7, 2023, 10 pages.

U.S. Patent & Trademark Office, Non-Final Office Action for U.S. Appl. No. 16/937,508, dated Jun. 23, 2023, 21 pages.

Mirzaei, F. et al., "A Kalman Filter-Based Algorithm for IMU-Camera Calibration: Observability Analysis and Performance Evaluation," IEEE Transactions on Robotics, 24(5), pp. 1143-1156, Oct. 2008.

Hartley, et al., "Epipolar Geometry and the Fundamental Matrix," Multiple View Geometry, Chapter 9.

U.S. Patent & Trademark Office, Non-Final Office Action for U.S. Appl. No. 17/150,271, dated Sep. 15, 2022, 18 pages.

Richard Hartley, An Investigation of the Essential Matrix, 2001 (Year: 2001).

Pedro Miraldo, On the Generalized Essential Matrix Correction: An Efficient Solution to the Problem and Its Applications, Jun. 6, 2020, Journal of Mathematical Imaging and Vision (Year: 2020).

U.S. Patent & Trademark Office, Final Office Action for U.S. Appl. No. 17/150,271, dated Dec. 22, 2022, 21 pages.

Jeong, Jingyong et al. Road is Enough! Extrinsic Calibration of Non-Overlapping Stereo Camera and LiDAR Using Road Information. arxiv.org, Cornell University Library, 201 Olin Library Cornell University Ithaca, NY 14853, Feb. 27, 2019 (Feb. 27, 2019), XP081121682.

Grubl, Alexander. European Application No. 21181384.5, Extended European Search Report dated Nov. 25, 2021, pp. 1-8.

U.S. Patent & Trademark Office, Notice of Allowance for U.S. Appl. No. 16/937,508, dated Oct. 13, 2023, 9 pages.

* cited by examiner

MULTI-SENSOR COLLABORATIVE CALIBRATION SYSTEM

TECHNICAL FIELD

This document describes techniques to perform multi-sensor calibration for sensors located in a vehicle.

BACKGROUND

A vehicle may include cameras attached to the vehicle for several purposes. For example, cameras may be attached to a roof of the vehicle for security purposes, for driving aid, or for facilitating autonomous driving. Cameras mounted on a vehicle can obtain images of one or more areas surrounding the vehicle. These images can be processed to obtain information about the road or about the objects surrounding the vehicle. For example, images obtained by a camera can be analyzed to determine distances of objects surrounding the autonomous vehicle so that the autonomous vehicle can be safely maneuvered around the objects.

SUMMARY

This patent document describes collaborative calibration techniques to calibrate multiple sensors located on or in a vehicle using, for example, sensor data obtained from the multiple sensors, a position and orientation of the vehicle, and prior calibration matrices, where each prior calibration matrix describes extrinsic parameters (e.g., location, or translation, and orientation) of one sensor relative to another sensor. The collaborative calibration techniques can calibrate more than one set of at least two sensors and can provide consistency of calibration between the multiple sensors on the vehicle.

Described herein is a method of autonomous vehicle operation, comprising: obtaining, from a first sensor and a second sensor located on a vehicle, sensor data items of an area that comprises a plurality of calibration objects; determining, from the sensor data items for each of the first sensor and the second sensor, attributes of the plurality of calibration objects; determining, for the first sensor and the second sensor, an initial matrix that describes a first set of extrinsic parameters between the first sensor and the second sensor based at least on the attributes of the plurality of calibration objects; determining an updated matrix that describes a second set of extrinsic parameters between the first sensor and the second sensor based at least on the initial matrix and a location of at least one calibration object; and performing autonomous operation of the vehicle using the second set of extrinsic parameters and additional sensor data received from the first sensor and the second sensor when the vehicle is operated on a road.

In another exemplary aspect, the above-described methods are embodied in the form of processor-executable code and stored in a non-transitory computer-readable storage medium. The non-transitory computer readable storage includes code that when executed by a processor, causes the processor to implement the methods described in the embodiments.

In yet another exemplary embodiment, a device or a system comprising a processor that is configured or operable to perform the above-described methods is disclosed.

The above and other aspects and their implementations are described in greater detail in the drawings, the descriptions, and the claims.

DETAILED DESCRIPTION

An autonomous vehicle includes sensors such as cameras, RADARs and Light Detection and Ranging (LiDAR) sensors mounted on the autonomous vehicle to obtain sensor data items (e.g., an image from camera and point cloud map from LiDAR sensor) of one or more areas surrounding the autonomous vehicle. These sensor data items can be analyzed by a computer on-board the autonomous vehicle to obtain distance or other information about the road or about the objects surrounding the autonomous vehicle. The sensors on the autonomous vehicle are calibrated so that the computer on-board the autonomous vehicle can precisely or accurately detect an object and determine its distance. This patent document describes exemplary multi-sensor collaborative calibration techniques that can calibrate multiple sensors using an example Simultaneous Calibration, Localization and Mapping (SCLAM) method.

Figure 1:
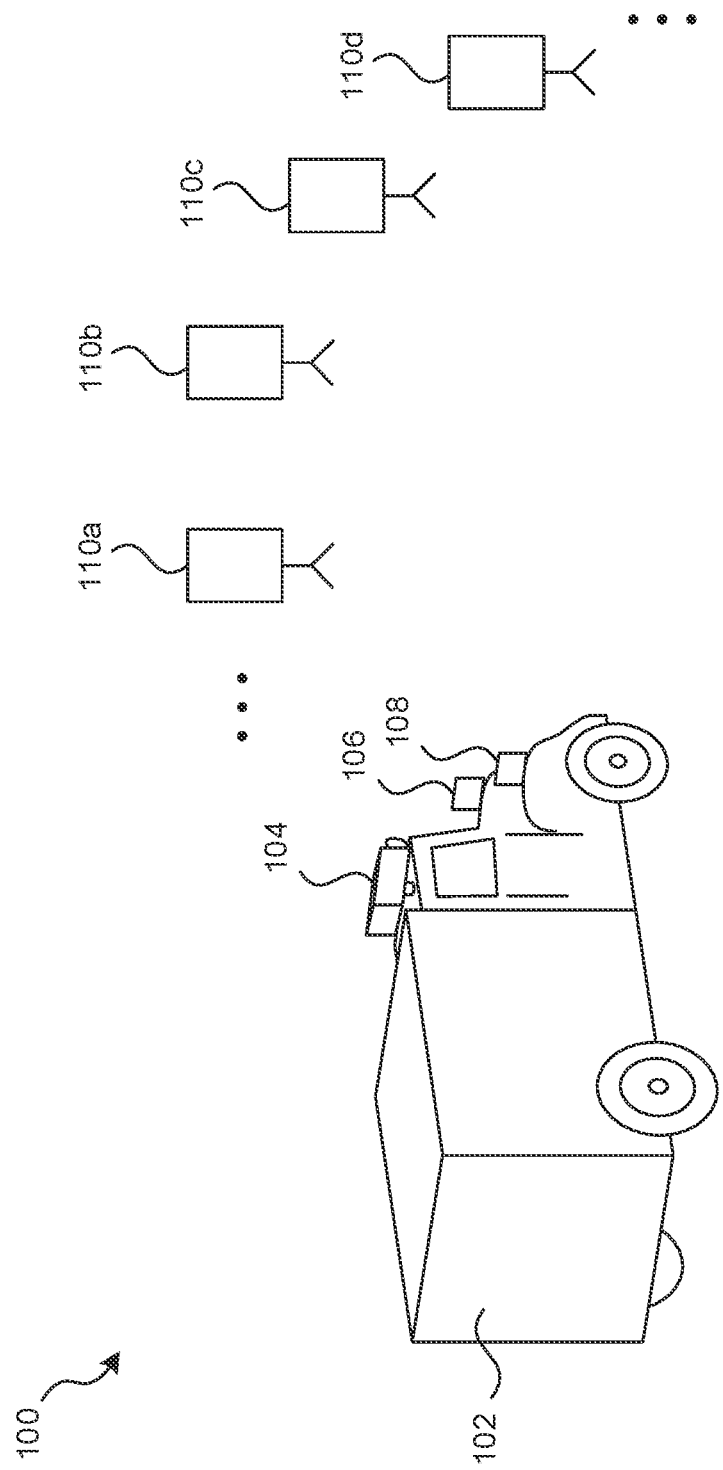
FIG. 1 shows an exemplary multi-sensor collaboration calibration system for calibrating multiple sensors on a vehicle.

FIG. 1 shows an exemplary multi-sensor collaboration calibration system 100 that includes a vehicle 102 that includes a plurality of cameras, RADARs, and LiDAR sensors. In FIG. 1, a single camera 104, a single LiDAR sensor 106, and a single RADAR 108 is shown for ease of description. However, the plurality of cameras, RADARs, and LiDAR sensors can be located on or positioned on the vehicle 102 to obtain sensor data items of a plurality of calibration boards 110a-110d located around the vehicle 102. The calibration boards 110a-110d and the vehicle 102 may be located in a warehouse or a building in which the vehicle 102 may perform the example multi-sensor collaborative calibration techniques. In the example multi-sensor collaboration calibration system of FIG. 1, four calibration boards 110a-110d are located in front of the vehicle 102 for ease of description. Additional calibration boards can be added or utilized in the calibration techniques. For example, additional calibration boards can be located around the vehicle 102 (e.g., to the front, the sides and rear of the vehicle 102). The collaborative calibration techniques described herein for the camera 104, LiDAR sensor 106, and RADAR 108 can be applied to other sensors (e.g., inertial measurement unit (IMU) device) that are located on the vehicle 102. The vehicle 102 can be an autonomous vehicle.

Each calibration board may have a shape that may include a different calibration pattern. The camera 104 obtains an image of an area comprising the calibration boards 110a-110d, the LiDAR 106 obtains point cloud data (PCD) of an area comprising the calibration boards 110a-110d, and the RADAR 108 obtains radar points of the area comprising the calibration boards 110a-110d. The vehicle 102 includes a computer located in the vehicle 102. This in-vehicle computer processes the image obtained by the camera 104, the PCD obtained by the LiDAR sensor 106, and the radar points obtained by the RADAR 108 as further described in FIGS. 2 to 6.

Figure 2:
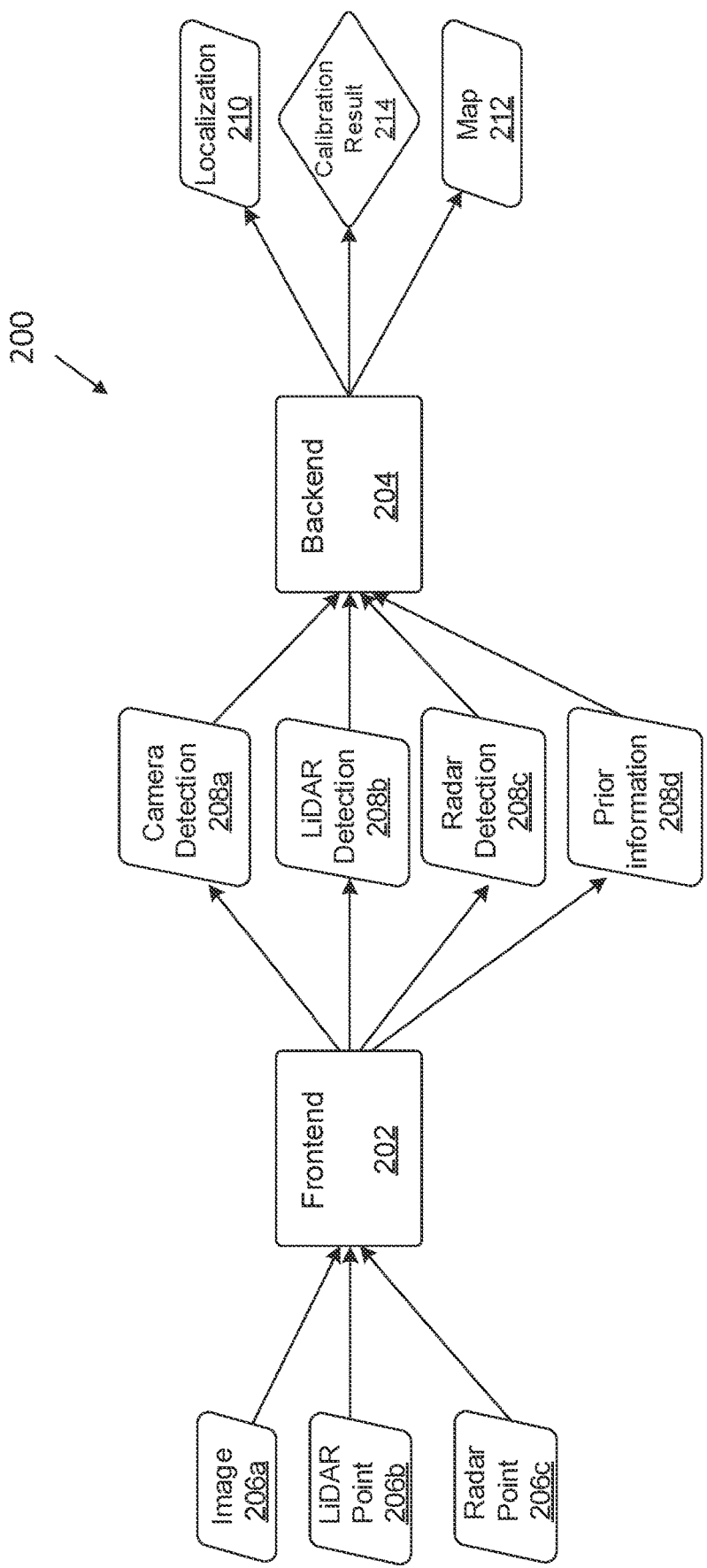
FIG. 2 shows an overview of a frontend signal processing and a backend signal processing performed by a computer in a vehicle to calibrate the multiple sensors on the vehicle.
Figure 3:
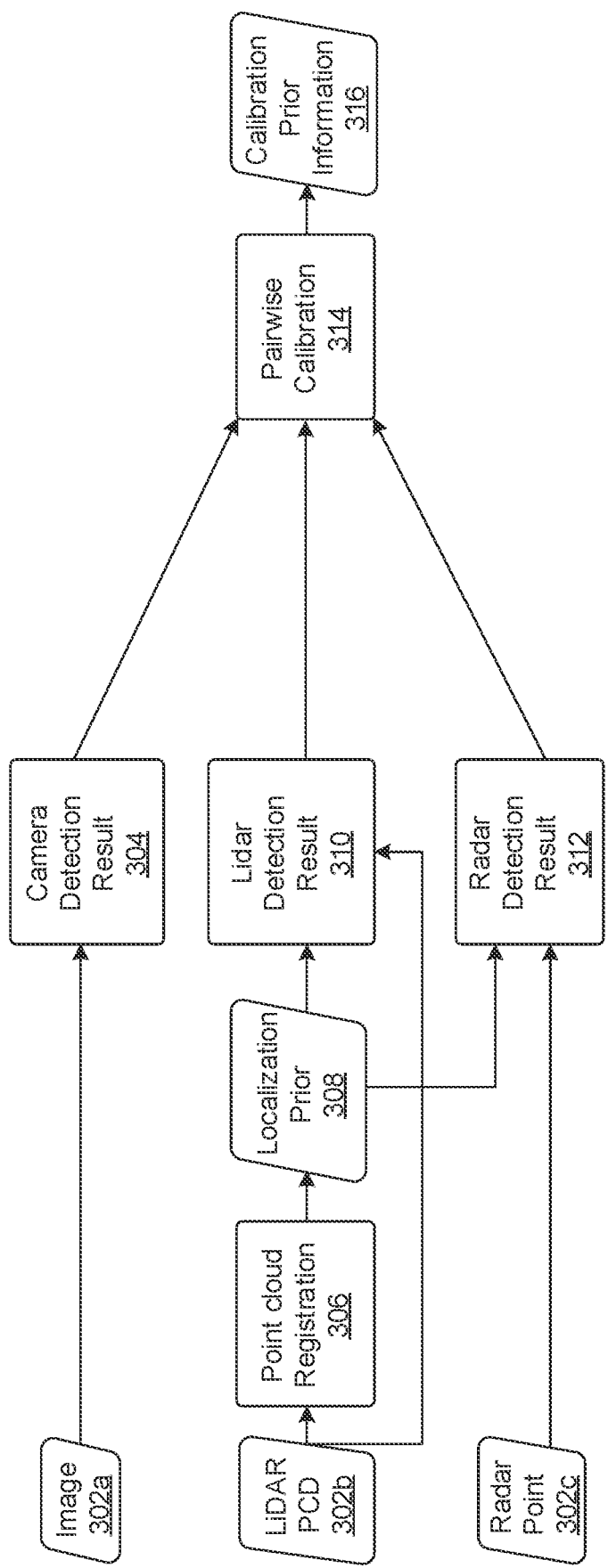
FIG. 3 shows a flowchart of an example frontend signal processing performed by a frontend module of a computer located in a vehicle.
Figure 4:
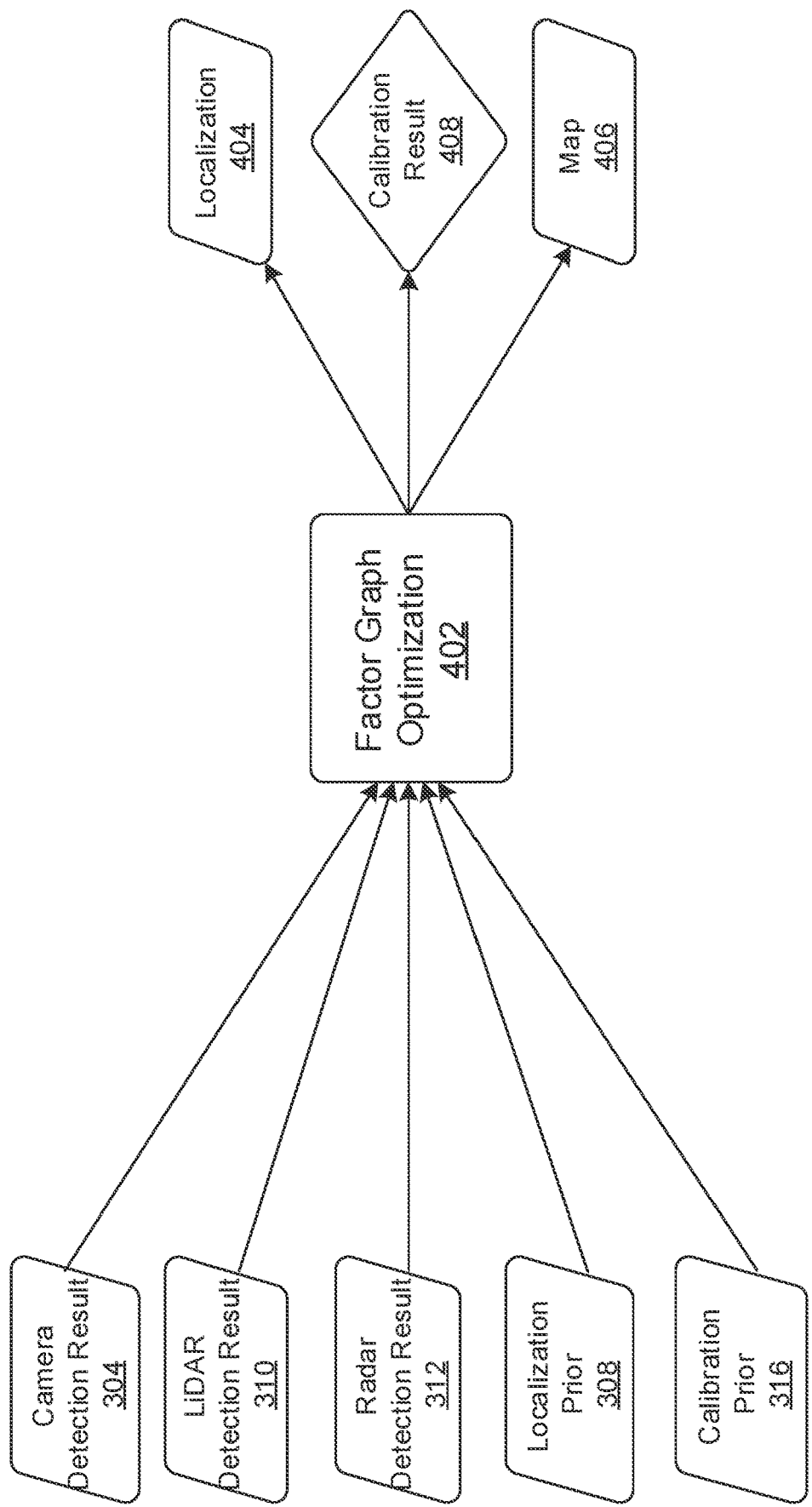
FIG. 4 shows a flowchart of an example backend signal processing performed by a backend module of a computer located in a vehicle.

FIG. 2 shows an overview 200 of a frontend signal processing 202 and a backend signal processing 204 performed by a computer in a vehicle to calibrate the multiple sensors on the vehicle. The computer located in the vehicle includes a frontend module (shown as 715 in FIG. 7) that performs the frontend signal processing 202. The computer also includes a backend module (shown as 720 in FIG. 7) that performs the backend signal processing 204. As further described below, FIG. 2 provides an overview of the collaborative calibration technique performed using the frontend signal processing 202 and the backend signal processing 204. FIGS. 3 and 4 further describe in greater detail the frontend and backend signal processing, respectively.

In FIG. 2, the frontend module performs the frontend signal processing 202 by obtaining the sensor data from the multiple sensors on the vehicle that are described in FIG. 1. The frontend module receives a sequence of raw sensor data from the sensors located on the vehicle. As shown in FIG. 2, the frontend module performs a frontend signal processing 202 by receiving an image data 206a from a camera, PCD 206b from a LiDAR sensor, and radar points data 206c from a RADAR system. The image data 206a includes a first array described as a t*w*h array where t is the number of frames in the image data, w is the width of the image data, and h is the height of the image data. The PCD 206b includes a second array described as a t*n*3 array where n is a number of the LiDAR points, and 3 means the x, y, and z in lidar coordinates. The radar point data 206c includes a third array described as a t*n*2 array where n is a number of the radar points, and 2 means the radius (r) to a point on a plane of a calibration board, and an angle (theta) from the Radar to the point on the plane of the calibration board in radar coordinates.

The frontend module performs the frontend signal processing 202, as further described in FIG. 3, to output the object detection results 208a-208c for all the sensors. The frontend module performs signal processing on the sensor data received from the sensors on the vehicle to identify attributes (e.g., coordinates of corners, shape, pattern, etc.,) of the calibration boards. The camera detection results 208a includes a t*m*2 array where t is the number of frames and m is the number of calibration boards detected from the image data and 2 means the coordinate of the corners of the calibration boards in the image data. The LiDAR detection results 208b includes a t*m*3 array where 3 means x, y and z of the corners of the calibration boards in lidar coordinate. The Radar detection result 208c includes a t*m*2 array, where 2 means the radius (r) to a point on a plane of a calibration board and an angle (theta) from the Radar to a point on the plane of the calibration board in radar coordinates.

The frontend module also outputs prior information 208d that includes at least (1) pair-wise calibrations between multiple sets of two sensors (e.g., LiDAR to camera pairwise calibration, Radar to LiDAR pairwise calibration, etc., as further described in Equations (1) to (3) below), and (2) localization prior information (e.g., position and/or orientation) of the vehicle. The pairwise calibration prior information includes a 4*4 SE(3) calibration matrix for each calibration sensor pair, where SE(3) is a Lie group. The localization prior information includes a t*4*4 where t is the number of the frame and each 4*4 SE(3) matrix represents the vehicle pose (e.g., position and orientation) in a map coordinate. The frontend module may obtain the vehicle's pose from a global positioning system (GPS) device on the vehicle.

The backend module of the computer located in the vehicle performs backend signal processing 204 using the object detection results 208a-208c for all the sensors and the priors information 208d. The backend module performs signal processing, as further described in FIG. 4, to obtain from the frontend module and/or further refine:

(1) localization information 210 that is described as a t*4*4 array where t is the number of the frame and each 4*4 SE(3) matrix represents the vehicle pose (e.g., position and orientation) in the map coordinate;

(2) map information 212 that is described as a m*3 array that represents the calibration boards' location in the map coordinate where m is a number of the calibration boards; and (3) calibration results 214 that is described as a 4*4 SE(3) calibration matrix for each calibration sensor pair, where the calibration matrix includes transformation between two sensors of each calibration sensor pair.

The example headings for the various sections below are used to facilitate the understanding of the disclosed subject matter and do not limit the scope of the claimed subject matter in any way. Accordingly, one or more features of one example section can be combined with one or more features of another example section.

I. Frontend Signal Processing

FIG. 3 shows a flowchart of an example frontend signal processing performed by a frontend module of a computer located in a vehicle. The frontend module obtains sensor data (e.g., image, LiDAR PCD, and/or radar point) to detect attributes (e.g., corners, shape, pattern, etc.,) of the calibration boards. The frontend module performs image processing on the image 302a obtained from the cameras to obtain camera detection results 304, which as mentioned above, includes a t*m*2 array where t is the number of frames and m is the number of calibration boards detected from the image data and 2 means the coordinate of the corners of the calibration boards in the image data. The frontend module performs signal processing on the LiDAR PCD 302b using a point cloud registration 306 and prior localization 308 of the LiDAR to obtain LiDAR detection results 310. The prior localization 308 for the LiDAR detection 310 includes previously known location of the LiDAR(s) obtained from the point cloud registration 306 process and previously known locations of the calibration boards. The LiDAR detection results 310 includes a t*m*3 array where 3 means x, y and z of the corners of the calibration boards with respect to the lidar coordinate system. The frontend module performs signal processing on the radar point data 302c using prior localization 308 to obtain a Radar detection result 312, which includes a t*m*2 array where 2 means the radius (r) and angle (theta) in radar coordinate of the calibration boards. The prior localization 308 used for Radar detection 312 includes previously known location of the Radar and previously known locations of the calibration boards.

The frontend module performs a pairwise calibration technique 314 on the camera detection result 304, LiDAR detection result 310, and Radar detection result 312 using Equations (1)-(3), below. The frontend module employs Equation (1) to perform a LiDAR-Camera pairwise calibration:

$$T_{lidar}^{cam^*} = \text{argmin} \sum_i \|P_{cam}^i - KDT_{lidar}^{cam} P_{lidar}^i\|_2^2 \quad \text{Equation (1)}$$

where $T_{lidar}^{cam^*}$ is a transformation matrix that describes transformation (also known as extrinsic parameters (e.g., translation and orientation)) between the LiDAR sensor and a camera, K and D are the pre-calibrated camera intrinsic parameters that describe optical characteristics (e.g., focal length, distortion, optical center, etc.,) of the camera, $P_{cam}$ is the camera detection result 304, and $P_{lidar}$ is the lidar detection result 310. The frontend module uses Equation (1) to find the extrinsic parameters between LiDAR and camera (i.e., $T_{lidar}^{cam}$) that minimize the projection error between the LiDAR observation (also known as LiDAR sensor data or LiDAR PCD) projected to the image using $T_{lidar}^{cam}$ and the camera observation (also known as camera sensor data or camera obtained image(s)).

The frontend module uses Equation (2) to perform a LiDAR-LiDAR pairwise calibration:

$$T_{lidar_j}^{lidar_k^*} = \text{argmin} \sum_i \|P_{lidar_k}^i - T_{lidar_j}^{lidar_k} P_{lidar_j}^i\|_2^2 \quad \text{Equation (2)}$$

where $T_{lidar_j}^{lidar_k^*}$ is a transformation matrix that describes transformation (also known as extrinsic parameters (e.g., translation and orientation)) between one LiDAR sensor (lidar$_k$) and another LiDAR sensor (lidar$_j$), $P_{lidar\_k}$ is a lidar detection result of one LiDAR sensor, and $P_{lidar\_j}$ is a lidar detection result of another LiDAR sensor. The frontend module uses Equation (2) to find the extrinsic parameters between one LiDAR and another LiDAR that minimize the projection error between the observations from the one LiDAR projected to the observations from another LIDAR.

The frontend module utilizes Equation (3) to perform a Radar-LiDAR pairwise calibration:

$$T_{lidar}^{radar^*} = \text{argmin} \sum_i \|h(P_{radar}^i) - (T_{lidar}^{radar} P_{lidar}^i)[0:2]\|_2^2 \quad \text{Equation (3)}$$

where $T_{lidar}^{radar^*}$ is a transformation matrix that describes transformation (also known as extrinsic parameters (e.g., translation and orientation)) between the Radar and a LiDAR sensor, $h(r,\theta)=[r^*\cos(\theta),r^*\sin(\theta)]^T$ is a transformation from polar coordinate to Cartesian coordinate, r is radius, theta ($\theta$) is angle, $(T_{lidar}^{radar} P_{lidar}^i)[0:2]$ is the first two indices of $T_{lidar}^{radar} P_{lidar}^i$, $P_{radar}$ is the Radar detection result 312, and $P_{lidar}$ the lidar detection result 310. The frontend module uses Equation (3) to find the extrinsic parameters between the LiDAR and a Radar that minimize the projection error between the observations from the LiDAR projected to the data obtained by the Radar.

The transformations matrices $T_{lidar}^{cam^*}$, $T_{lidar_j}^{lidar_k^*}$, and $T_{lidar}^{radar^*}$ are included in the pairwise calibration prior information 316 (also described in the prior information 208d in FIG. 2) that include a 4*4 SE(3) calibration matrix for each calibration sensor pair. The transformation solved in Equations (1) to (3) are prior information obtained by the frontend module and provided to the backend module for further refinement as further described in Section II of this patent document, below.

II. Backend Signal Processing

FIG. 4 shows a flowchart of an example backend signal processing performed by a backend module of a computer located in a vehicle. The backend module performs a factor graph optimization 402 based on the camera detection result 304, LiDAR detection result 310, Radar detection result 313, prior information (e.g., localization prior 308 and calibration prior 316 information) obtained from the frontend module as described in FIGS. 2-3. The factor graph optimization 402 is further described in FIG. 5 and it may include a base LiDAR (or one of the LiDAR sensors) to calibrate all the sensors to the base LiDAR.

Figure 5:
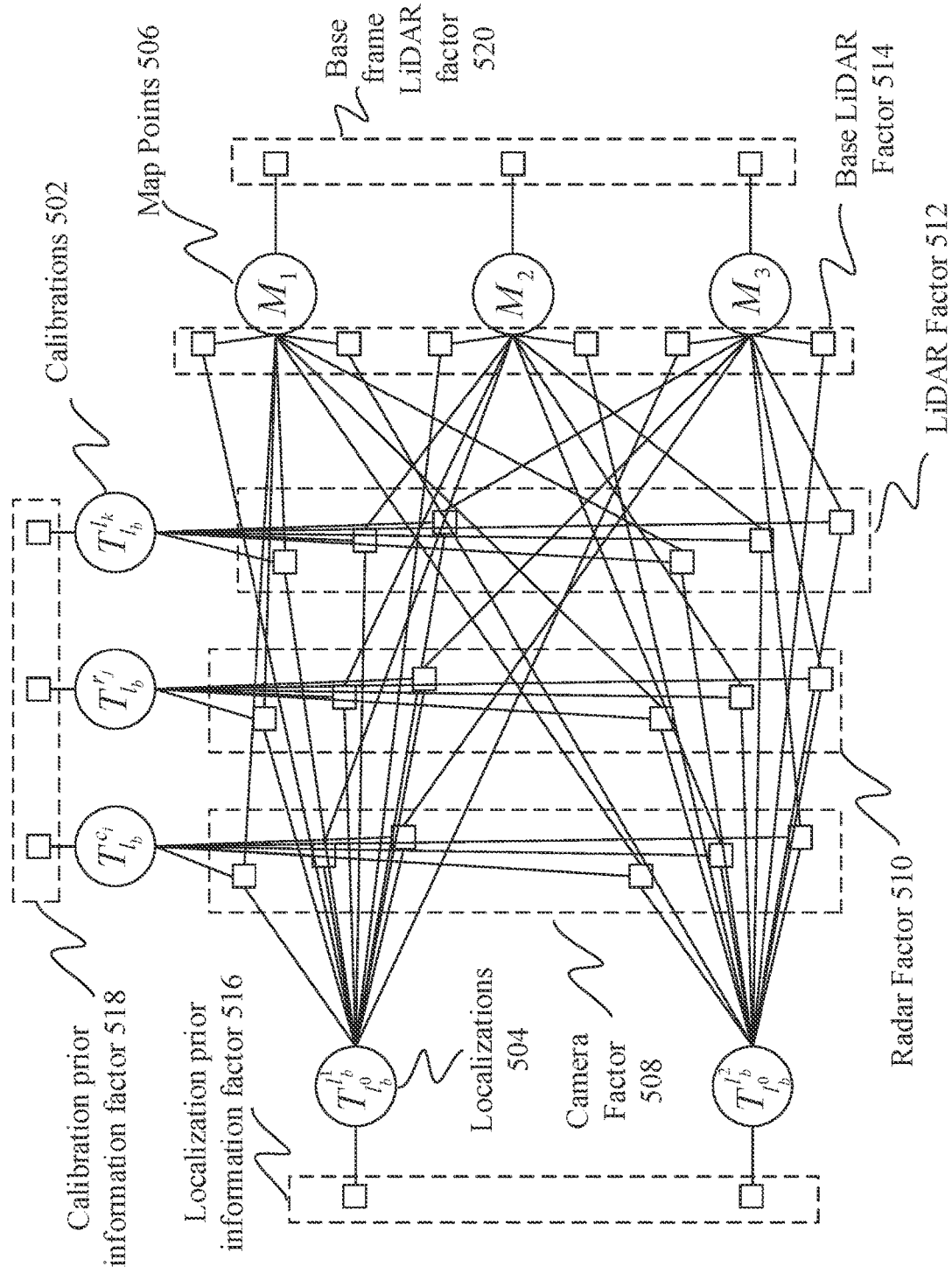
FIG. 5 shows an example factor graph optimization technique performed by the backend module.

FIG. 5 shows an example factor graph optimization technique performed by the backend module. As further described below, a factor graph is a graph inference model that can solve the value of states 502, 504, 506 shown in circles in FIG. 5 in order to minimize all the loss that is defined by all the factors 508-520 shown in rectangles with broken lines. The squares in each rectangle includes an observation or sensor data obtained by the sensors (e.g., camera, Radar, LiDAR sensor) or measurement devices (e.g., GPS device) located on a vehicle. States in the factor graph describe the variable whose values are unknown and need to be solved by the backend module, and each factor can be considered a loss term that needs to be minimized by the backend module when solving the factor graph. The top three squares in a camera factor 508, a radar factor 510, and a LiDAR factor 512 are associated with observations at time t=0, and the bottom three squares in the camera factor 508, the radar factor 510, and the LiDAR factor 512 are observations at time t=1.

The example factor graph shown in FIG. 5 includes a camera factor 508, a radar factor 510, and LiDAR factor 512 for a vehicle that obtains sensor data from camera(s), LiDAR sensor(s), and Radar(s). In some embodiments, the factor graph may be employed by the backend module for a vehicle with at least two sets of sensors, such as a first set of one or more cameras and a second set of one or more LiDAR sensors; or a first set of one or more cameras and a second set of one or more Radars. In some embodiments, sensors other than LiDAR sensors, cameras, and Radars can be used with the factor graph technique.

The states in the collaborative calibration technique include: (1) Calibration states 502; (2) Localization states 504; and (3) Map states 506. As shown in FIG. 5, the calibration states 502 include: (a) a camera to LiDAR calibration $T_{l_b}^{c_i}$ which includes a matrix that indicates a calibration between the i-th camera ($c_i$) and a base LiDAR ($l_b$) (or $T_{l_b}^{c_i}$ indicates the extrinsic parameters (transformation) between the ith camera and the base LiDAR); (b) a Radar to LiDAR calibration $T_{l_b}^{c_i}$ which includes a matrix that indicates a calibration (or transformation) between the j-th Radar ($r_j$) and the base LiDAR; and (c) a LiDAR to LiDAR calibration $T_{l_b}^{c_i}$ which includes a matrix that indicates a calibration (or transformation) between the k-th LiDAR ($l_k$) and the base LiDAR. The initial values of the calibration states 502 are obtained from transformations matrices $T_{lidar}^{cam^*}$, $T_{lidar_j}^{lidar_k^*}$, and $T_{lidar}^{radar^*}$ obtained from Equations (1) to (3).

For the localization states 504, the backend module uses the base LiDAR coordinates (e.g., a location or pose of a pre-selected LiDAR sensor from the multiple LiDAR sensors) in the 0-th frame as the base frame, and the localization state is the transformation (e.g., extrinsic parameters)

between the rest of the base LiDAR coordinates and this base frame. In an example shown in FIG. 5, $T_{l_b}{}^{o_{l_b^1}}$ describes the transformation between the base LiDAR frame at time t=1 and the base LiDAR frame at time t=0. The localization states 504 are localizations that are "offset" localization where the first base lidar frame is used as a map frame.

For the map states 506, the locations of each of the calibration boards (e.g., $M_1$, $M_2$, $M_3$, etc., shown in FIG. 5) in the base frame are solved by the backend module. The locations of each of the calibration boards can be coordinates of a center point of the corners of a calibration board, that is a point that is centrally located between the corners of the calibration board. In an example shown in FIG. 5, $M_2$ describes a location of a second calibration board in the base frame.

The backend module solves the following Equations (4)-(10) for each of the factors 508-520. The parameters in the function $\Theta(\ )$, below, are the target parameters that the backend module will solve to minimize the summation of the loss from all the factors. The probability of the value in a multivariate Gaussian distribution is represented by G(value, m, $\Sigma$), where m is mean and $\Sigma$ is a variance term in multivariate Gaussian distribution.

Camera Factor 508 in FIG. 5: $\Theta\left(T_{l_b}^{c_i}, T_{l_0}^{t_b}, M_m\right) =$ $$-\log\left(G\left(\hat{y}_{c_i^t}^m, KT_{l_0}^{t_b} M_m, \Sigma_{c_i}\right)\right)$$

Equation (4)

Radar Factor 510: $\Theta\left(T_{l_b}^{r_j}, T_{l_0}^{t_b}, M_m\right) =$ $$-\log\left(G(h(\hat{y}_{r_t^j}^m), \left(T_{l_b}^{r_j} T_{l_0}^{t_b}\right)[0:2], \Sigma_{r_j}\right)\right)$$

where $h(r, \theta) = [r*\cos(\theta), r*\sin(\theta)]^T$

Equation (5)

Lidar Factor 512: $\Theta\left(T_{l_b}^{l_k}, T_{l_0}^{t_b}, M_m\right) =$ $$-\log\left(G\left(\hat{y}_{l_t^k}^m, T_{l_b}^{l_k} T_{l_0}^{t_b} M_m, \Sigma_{l_k}\right)\right)$$

Equation (6)

Base LiDAR Factor 514: $\Theta\left(T_{l_0}^{t_b}, M_m\right) =$ $$-\log\left(G\left(\hat{y}_{l_t^b}^m, T_{l_0}^{t_b} M_m, \Sigma_{l_b}\right)\right)$$

Equation (7)

Base frame lidar factor 520: $\Theta(M_m) =$ $$-\log\left(G\left(\hat{y}_{l_b^0}^m, M_m, \Sigma_{l_b}\right)\right)$$

Equation (8)

Localization Prior Factor 516: $\Theta\left(T_{l_0}^{t_b}\right) =$ $$-\log\left(G\left(\hat{\xi}_{l_0}^{t_b}, \xi_{l_0}^{t_b}, \Sigma_{loc}\right)\right) \text{ where } \xi_{l_0}^{t_b},$$

$\hat{\xi}_{l_0}^{t_b}$ are the SE(3) representation of $\hat{T}_{l_0}^{t_b}$, $T_{l_0}^{t_b}$ respectively.

Equation (9)

Calibration Prior Factor 518: $\Theta\left(T_{l_b}^?\right) =$ $$-\log\left(G\left(\hat{\xi}_{l_b}^?, \xi_{l_b}^?, \Sigma_{calib}\right)\right) \text{ where } \hat{\xi}_{l_b}^?,$$

$\xi_{l_b}^?$ are the SE(3) representation of $\hat{T}_{l_b}^?$, $T_{l_b}^?$ respectively.

Equation (10)

The question marks in Equation (10) indicates that the sensor data and/or values of one or more sensors other than the base LiDAR sensor can be used with Equation (10) to calibrate the one or more sensors.

In Equations (4)-(10), the backend module processes the observations obtained from the frontend module, where camera detection result $\hat{y}_{c_t^i}^m$ describes the i-th camera's observation in time t on m-th calibration board; LiDAR detection result $\hat{y}_{l_t^k}^m$ describes the k-th lidar's observation in time t on m-th calibration board. And $\hat{y}_{l_t^b}^m$ means the base LiDAR observation in time t on m-th calibration board; Radar detection result $\hat{y}_{r_t^j}^m$ describes the j-th Radar's observation in time t on m-th calibration board; calibration prior information $\hat{T}_{l_b}^{c_i}$ describes the calibration prior between i-th camera and base LiDAR; and localization prior information $\hat{T}_{l_0}^{t_{l_b^1}}$ describes the localization prior for the transformation between base LiDAR frame in t=1 and the base frame (base LiDAR frame at t=0).

Equations (4)-(10) include noise parameters that represent the uncertainty of the observation and may quantify the uncertainty of the observations that are output by the frontend module. The backend module treats noise parameters as pre-set parameters that may be determined empirically or from estimation. The backend module considers the following noise parameters that are included in Equations (4)-(10):

Camera Detection Noise: $\Sigma_{c_i}$ 2*2 covariance matrix that represents the uncertainty for i-th camera detection Radar Detection Noise: 2*2 covariance matrix that represents the uncertainty for j-th Radar detection Lidar Detection Noise: $\Sigma_{l_k}$ 3*3 covariance matrix that represents the uncertainty for k-th lidar detection (since lidar detection is 3d)

Localization Prior Noise: $\Sigma_{loc}$ 6*6 covariance matrix that represents the uncertainty for the localization prior from frontend (SE(3) has 6 degrees of freedom)

Calibration Prior Noise: $\Sigma_{calib}$ 6*6 covariance matrix that represents the uncertainty for the calibration prior from frontend (SE(3) has 6 degrees of freedom)

The backend module can represent losses for each factor 508-520 as the negative log likelihood for the Gaussian distribution. For the negative log likelihood, the loss can represent the probability distance. An advantage of this loss design is that it can normalize all the loss in the same scale. The backend module performs an optimization by solving States=argmin $\Sigma\theta$, where $\theta$ describes the functions $\Theta(\ )$ in Equations (4)-(10), to find the value of all the states that minimize the summation of the loss from all the factors, and outputs the calibrations as calibration results (shown as 214 in FIGS. 2 and 408 in FIG. 4) from the solved states. Thus, as shown in FIG. 4, the backend module obtains from the frontend module and/or refines:

(1) localization information 404 that is described as a t*4*4 array where t is the number of the frame and each 4*4 SE(3) matrix represents the vehicle pose (e.g., position and orientation) in the map coordinate;

(2) map information 406 that is described as a m*3 array that represents the location of the calibration boards in the map coordinate frame of reference where m is a number of the calibration boards; and (3) calibration results 408 that is described as a 4*4 SE(3) calibration matrix for each calibration sensor pair, where the calibration matrix includes transformation between two sensors of each calibration sensor pair.

The backend module performs the factor graph related options described in FIG. 5 by minimizing the summation of the loss from all the factors to obtain the calibration states 502; Localization states 504; and Map states 506. Thus, for example, backend module includes a camera to LiDAR calibration $T_{l_b}^{c_i}$ a Radar to LiDAR calibration $T_{l_b}^{r_j}$ and a LiDAR to LiDAR calibration $T_{l_b}^{l_k}$. The backend module can send all of the states related information (e.g., extrinsic parameters of the camera to LiDAR calibration $T_{l_b}^{c_i}$ to an autonomous operation module (shown as 725 in FIG. 7).

The autonomous operation module can receive sensor data (e.g., images, PCD, radar data) of an environment in which the autonomous vehicle is operating, where the sensor data is obtained from the multiple sensors onboard the vehicle. The autonomous operation module can instruct the autonomous vehicle to operate on a road (e.g., determine distance to vehicles in front of the autonomous vehicle, turn, apply brakes) based on the sensor data and based on the sensor data adjusted using the states information (e.g., the calibration states). In an example implementation, the autonomous operation module can use the calibration states (e.g., extrinsic parameters between a LiDAR sensor and a camera onboard the autonomous vehicle) to determine that an object determined by the autonomous operation module from the PCD of the LiDAR sensor is the same as the object determined by the autonomous operation module from an image of the camera.

Figure 6:
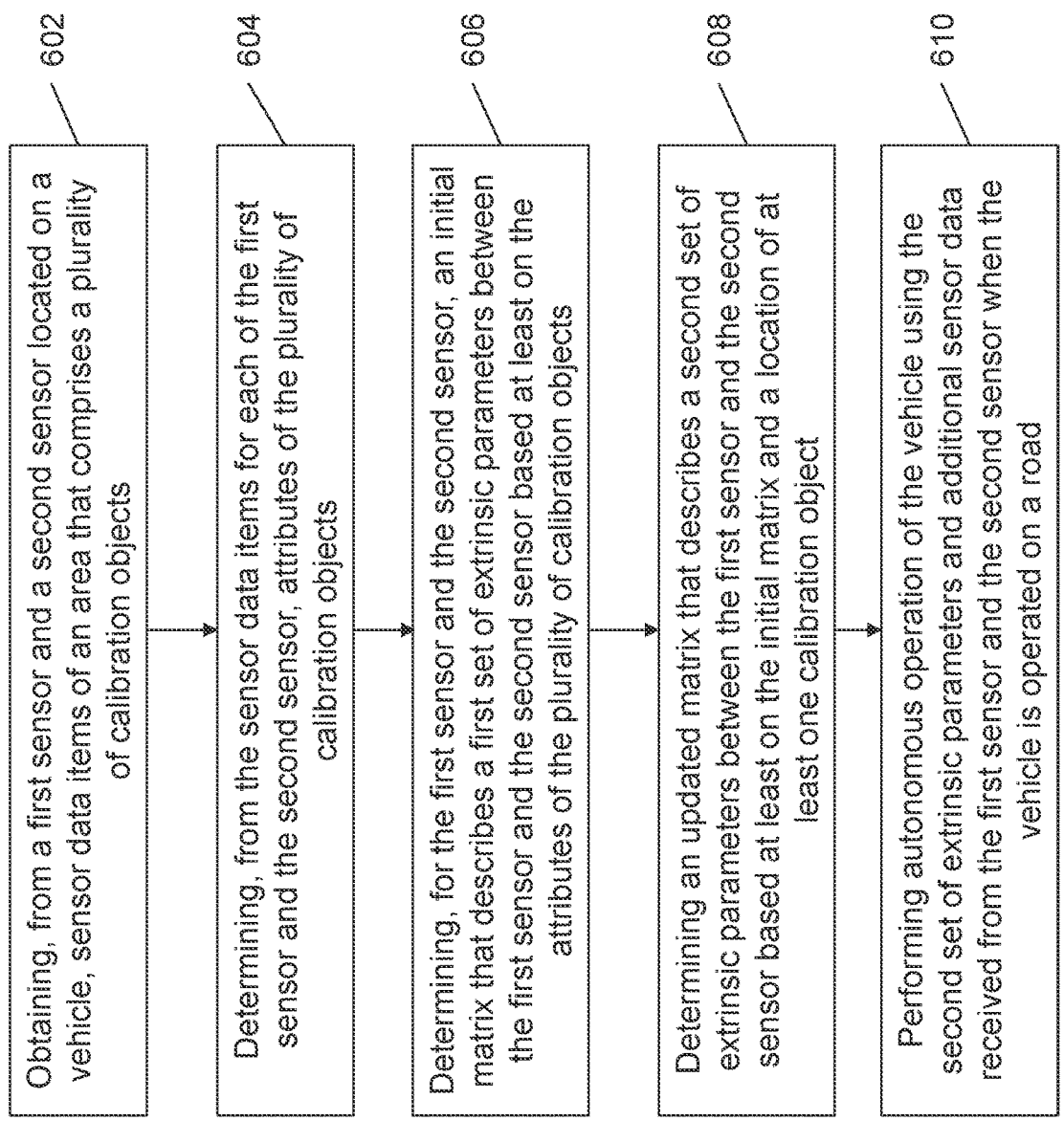
FIG. 6 shows an exemplary flow diagram for performing pairwise calibration for multiple sensors.

FIG. 6 shows an exemplary flow diagram for performing pairwise calibration for multiple sensors. Operation 602 includes obtaining, from a first sensor and a second sensor located on a vehicle, sensor data items of an area that comprises a plurality of calibration objects. Operation 604 includes determining, from the sensor data items for each of the first sensor and the second sensor, attributes of the plurality of calibration objects. Operation 606 includes determining, for the first sensor and the second sensor, an initial matrix that describes a first set of extrinsic parameters between the first sensor and the second sensor based at least on the attributes of the plurality of calibration objects. Operation 608 includes determining an updated matrix that describes a second set of extrinsic parameters between the first sensor and the second sensor based at least on the initial matrix and a location of at least one calibration object. Operation 610 includes performing autonomous operation of the vehicle using the second set of extrinsic parameters and additional sensor data received from the first sensor and the second sensor when the vehicle is operated on a road.

In some embodiments, the first sensor includes a camera, wherein the second sensor is a light detection and ranging (LiDAR) sensor, and wherein the initial matrix is determined by performing a pairwise calibration operation using: (1) a first set of coordinates of the plurality of calibration objects determined from a first sensor data item for the camera, (2) a second set of coordinates of the plurality of calibration objects determined from a second sensor data item for the LiDAR sensor, and (3) a set of intrinsic parameters that describe optical characteristics of the camera, and wherein the first set of coordinates and the second set of coordinates are the attributes of the plurality of calibration objects.

In some embodiments, the method of FIG. 6 further includes obtaining, from a second camera located on the vehicle, a third sensor data item of the area that comprises the plurality of calibration objects; and determining, a second initial matrix by performing another pairwise calibration operation between the LiDAR sensor and the second camera using: (1) the second set of coordinates of the plurality of calibration objects determined from the second sensor data item for the LiDAR sensor, (2) a third set of coordinates of the plurality of calibration objects determined from the third sensor data item for the second camera, and (3) another set of intrinsic parameters that describe optical characteristics of the second camera.

In some embodiments, the method of FIG. 6 further includes determining another updated matrix that describes another set of extrinsic parameters between the LiDAR sensor and the second camera based at least on the second initial matrix and the location of at least one calibration object. In some embodiments, the camera faces a front direction to capture a set of images of a region towards which the vehicle is driven, and wherein the second camera faces a side direction to capture another set of images of another region towards a side of the vehicle.

In some embodiments, the first sensor includes a first light detection and ranging (LiDAR) sensor, wherein the second sensor includes a second LiDAR sensor, and wherein the initial matrix is determined by performing a pairwise calibration operation using: (1) a first set of coordinates of the plurality of calibration objects determined from a first sensor data item for the first LiDAR, and (2) a second set of coordinates of the plurality of calibration objects determined from a second sensor data item for the second LiDAR sensor, and wherein the first set of coordinates and the second set of coordinates are the attributes of the plurality of calibration objects. In some embodiments, the location of the at least one calibration object includes a center point of the at least one calibration object. In some embodiments, the sensor data items are obtained by each of the first sensor and the second sensor at a same time. In some embodiments, the plurality of calibration objects and the vehicle are located in a building or a warehouse.

In some embodiments, the plurality of calibration objects are located at one or more distances relative to a location of the vehicle. In some embodiments, the plurality of calibration objects are located around the vehicle. In some embodiments, the performing autonomous operation of the vehicle comprises: determining a first object located on the road from the additional sensor data obtained from the first sensor; determining a second object located on the road from the additional sensor data obtained from the second sensor; and determining that the first object is same as the second object using the second set of extrinsic parameters. In some embodiments, the first sensor includes a Radar, wherein the second sensor includes a light detection and ranging (LiDAR) sensor, and wherein the initial matrix is determined by performing a pairwise calibration operation using at least: (1) a radius and an angle, for each calibration object, from the Radar to a point on a plane of a calibration object determined from a first sensor data item for the Radar, (2) a set of coordinates of the plurality of calibration objects determined from a second sensor data item for the LiDAR sensor, and wherein the radius and angle for each calibration object and the set of coordinates are the attributes of the plurality of calibration objects. In some embodiments, the initial matrix is determined by applying a transformation from polar coordinates to cartesian coordinates using the radius and the angle.

In some embodiments, the method of FIG. 6 further comprises: obtaining, from a second Radar located on the vehicle, a third sensor data item of the area that comprises the plurality of calibration objects; determining, a second initial matrix by performing another pairwise calibration operation between the LiDAR sensor and the second camera using: (1) the set of coordinates of the plurality of calibration objects determined from the second sensor data item for the LiDAR sensor, and (2) a second radius and a second angle, for each calibration object, from the second Radar to the point on the plane of a calibration object determined from a third sensor data item for the second Radar. In some embodiments, the method of FIG. 6 further comprises determining another updated matrix that describes another set of extrinsic parameters between the LiDAR sensor and the second Radar based at least on the second initial matrix and the location of at least one calibration object. In some embodiments, the updated matrix is determined by using a factor graph that minimizes a summation of at least a first factor associated with the first sensor and a second factor associated with the second sensor, and wherein each the first factor and the second factor is based at least on: (1) the initial matrix, (2) coordinates of at least one calibration object obtained from the sensor data items for the first sensor and the second sensor, (3) a third set of extrinsic parameters that describe a location or a pose of the second sensor at a first time and another location or another pose of the second sensor at a second time that is later in time than the first time, and (4) the location of the at least one calibration object. In some embodiments, the updated matrix is determined by using the factor graph that minimizes the summation of at least the first factor, the second factor, and a third matrix that represents a position and an orientation of the vehicle.

In some implementations, methods described in the various embodiments are embodied in a computer readable program stored on a non-transitory computer readable media. The computer readable program includes code that when executed by a processor, causes the processor to perform the methods described in some embodiments, including the method described in FIG. 6. In yet another exemplary embodiment, a device or a system comprising a processor that is configured or operable to perform the above-described methods is disclosed.

Figure 7:
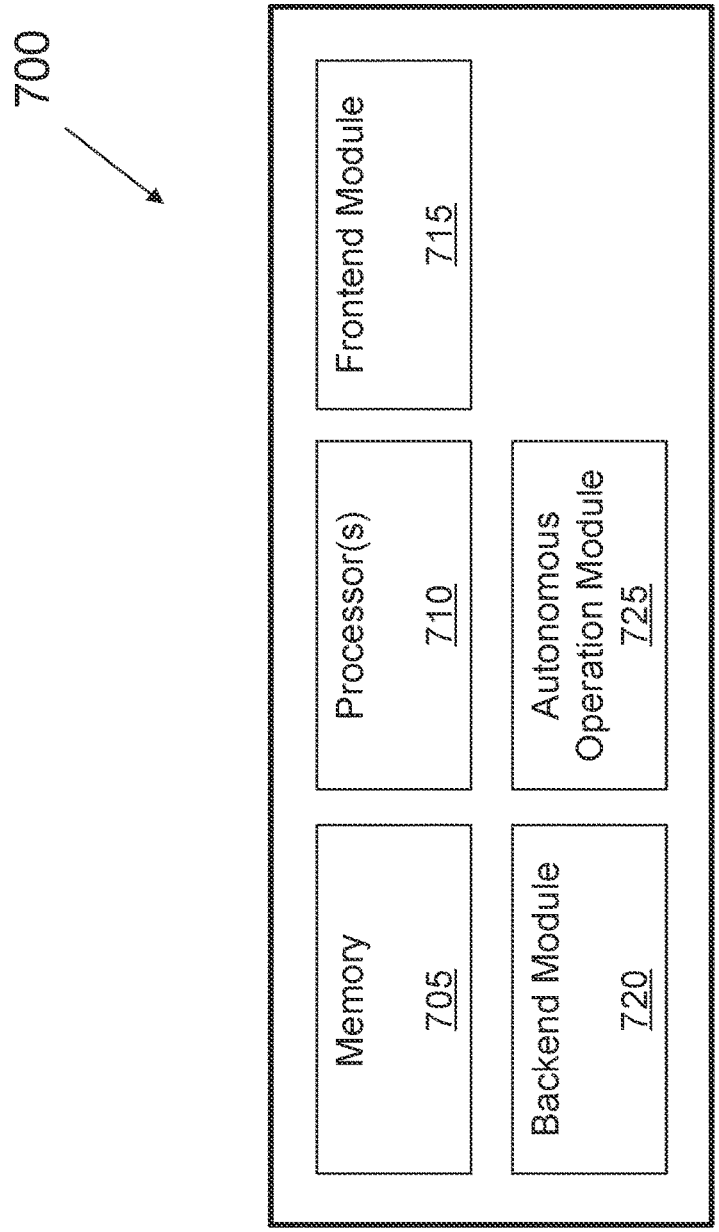
FIG. 7 shows an exemplary block diagram of a computer that may be located in a vehicle to perform multi-sensor collaborative calibration techniques described in some embodiments.

FIG. 7 shows an exemplary block diagram of a computer that may be located in a vehicle to perform multi-sensor collaborative calibration techniques described in some embodiments. The computer 700 includes at least one processor 710 and a memory 705 having instructions stored thereupon. The instructions upon execution by the processor 710 configure the computer 700 to perform the operations described for the frontend module 715, the backend module 720, and the autonomous operation module 725 as described in FIGS. 2 to 6, and/or the operations described in the various embodiments in this patent document.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of autonomous vehicle operation, comprising:
   obtaining, from a first sensor and a second sensor located on a vehicle, sensor data items of an area that comprises a plurality of calibration objects;
   determining, from the sensor data items for each of the first sensor and the second sensor, attributes of the plurality of calibration objects;
   determining, for the first sensor and the second sensor, an initial matrix that describes a first set of extrinsic parameters between the first sensor and the second sensor based at least on the attributes of the plurality of calibration objects;
   determining an updated matrix that describes a second set of extrinsic parameters between the first sensor and the second sensor based at least on the initial matrix and a location of at least one calibration object, wherein the updated matrix is determined by using a factor graph that minimizes a summation of at least a first factor associated with the first sensor and a second factor associated with the second sensor, and
   wherein each the first factor and the second factor is based at least on:
   (1) the initial matrix, (2) coordinates of at least one calibration object obtained from the sensor data items for the first sensor and the second sensor, (3) a third set of extrinsic parameters that describe a location or a pose of the second sensor at a first time and another location or another pose of the second sensor at a second time that is later in time than the first time, and (4) the location of the at least one calibration object; and performing autonomous operation of the vehicle using the second set of extrinsic parameters and additional sensor data received from the first sensor and the second sensor when the vehicle is operated on a road.

2. The method of claim 1, wherein the first sensor includes a camera, wherein the second sensor is a light detection and ranging (LiDAR) sensor, and wherein the initial matrix is determined by performing a pairwise calibration operation using:

(1) a first set of coordinates of the plurality of calibration objects determined from a first sensor data item for the camera, (2) a second set of coordinates of the plurality of calibration objects determined from a second sensor data item for the LiDAR sensor, and (3) a set of intrinsic parameters that describe optical characteristics of the camera, and wherein the first set of coordinates and the second set of coordinates are the attributes of the plurality of calibration objects.

3. The method of claim 2, further comprising:

obtaining, from a second camera located on the vehicle, a third sensor data item of the area that comprises the plurality of calibration objects; and determining, a second initial matrix by performing another pairwise calibration operation between the LiDAR sensor and the second camera using:

(1) the second set of coordinates of the plurality of calibration objects determined from the second sensor data item for the LiDAR sensor, (2) a third set of coordinates of the plurality of calibration objects determined from the third sensor data item for the second camera, and (3) another set of intrinsic parameters that describe optical characteristics of the second camera.

4. The method of claim 3, further comprising:

determining another updated matrix that describes another set of extrinsic parameters between the LiDAR sensor and the second camera based at least on the second initial matrix and the location of at least one calibration object.

5. The method of claim 3, wherein the camera faces a front direction to capture a set of images of a region towards which the vehicle is driven, and wherein the second camera faces a side direction to capture another set of images of another region towards a side of the vehicle.

6. The method of claim 1, wherein the first sensor includes a first light detection and ranging (LiDAR) sensor, wherein the second sensor includes a second LiDAR sensor, and wherein the initial matrix is determined by performing a pairwise calibration operation using:

(1) a first set of coordinates of the plurality of calibration objects determined from a first sensor data item for the first LiDAR, and (2) a second set of coordinates of the plurality of calibration objects determined from a second sensor data item for the second LiDAR sensor, and wherein the first set of coordinates and the second set of coordinates are the attributes of the plurality of calibration objects.

7. A system for calibration of multiple sensors on or in a vehicle, the system comprising a processor configured to:

obtain, from a first sensor and a second sensor located on a vehicle, sensor data items of an area that comprises a plurality of calibration objects;

determine, from the sensor data items for each of the first sensor and the second sensor, attributes of the plurality of calibration objects;

determine, for the first sensor and the second sensor, an initial matrix that describes a first set of extrinsic parameters between the first sensor and the second sensor based at least on the attributes of the plurality of calibration objects;

determine an updated matrix that describes a second set of extrinsic parameters between the first sensor and the second sensor based at least on the initial matrix and a location of at least one calibration object, wherein the updated matrix is determined by using a factor graph that minimizes a summation of at least a first factor associated with the first sensor and a second factor associated with the second sensor, and wherein each the first factor and the second factor is based at least on:

(1) the initial matrix, (2) coordinates of at least one calibration object obtained from the sensor data items for the first sensor and the second sensor, (3) a third set of extrinsic parameters that describe a location or a pose of the second sensor at a first time and another location or another pose of the second sensor at a second time that is later in time than the first time, and (4) the location of the at least one calibration object; and perform autonomous operation of the vehicle using the second set of extrinsic parameters and additional sensor data received from the first sensor and the second sensor when the vehicle is operated on a road.

8. The system of claim 7, wherein the location of the at least one calibration object includes a center point of the at least one calibration object.

9. The system of claim 7, wherein the sensor data items are obtained by each of the first sensor and the second sensor at a same time.

10. The system of claim 7, wherein the plurality of calibration objects and the vehicle are located in a building or a warehouse.

11. The system of claim 7, wherein the plurality of calibration objects are located at one or more distances relative to a location of the vehicle.

12. The system of claim 7, wherein the plurality of calibration objects are located around the vehicle.

13. A non-transitory computer readable storage medium having code stored thereon, the code, when executed by a processor, causing the processor to implement a method comprising:

obtaining, from a first sensor and a second sensor located on a vehicle, sensor data items of an area that comprises a plurality of calibration objects;

determining, from the sensor data items for each of the first sensor and the second sensor, attributes of the plurality of calibration objects;

determining, for the first sensor and the second sensor, an initial matrix that describes a first set of extrinsic parameters between the first sensor and the second sensor based at least on the attributes of the plurality of calibration objects;

determining an updated matrix that describes a second set of extrinsic parameters between the first sensor and the second sensor based at least on the initial matrix and a location of at least one calibration object, wherein the updated matrix is determined by using a factor graph that minimizes a summation of at least a first factor associated with the first sensor and a second factor associated with the second sensor, and wherein each the first factor and the second factor is based at least on:
(1) the initial matrix,
(2) coordinates of at least one calibration object obtained from the sensor data items for the first sensor and the second sensor,
(3) a third set of extrinsic parameters that describe a location or a pose of the second sensor at a first time and another location or another pose of the second sensor at a second time that is later in time than the first time, and
(4) the location of the at least one calibration object; and performing autonomous operation of the vehicle using the second set of extrinsic parameters and additional sensor data received from the first sensor and the second sensor when the vehicle is operated on a road.

14. The non-transitory computer readable storage medium of claim 13, wherein the performing autonomous operation of the vehicle comprises:
determining a first object located on the road from the additional sensor data obtained from the first sensor;
determining a second object located on the road from the additional sensor data obtained from the second sensor; and
determining that the first object is same as the second object using the second set of extrinsic parameters.

15. The non-transitory computer readable storage medium of claim 13, wherein the first sensor includes a Radar, wherein the second sensor includes a light detection and ranging (LiDAR) sensor, and wherein the initial matrix is determined by performing a pairwise calibration operation using at least:

(1) a radius and an angle, for each calibration object, from the Radar to a point on a plane of a calibration object determined from a first sensor data item for the Radar,
(2) a set of coordinates of the plurality of calibration objects determined from a second sensor data item for the LiDAR sensor, and
wherein the radius and angle for each calibration object and the set of coordinates are the attributes of the plurality of calibration objects.

16. The non-transitory computer readable storage medium of claim 15, wherein the initial matrix is determined by applying a transformation from polar coordinates to cartesian coordinates using the radius and the angle.

17. The non-transitory computer readable storage medium of claim 15, wherein the method further comprises:
obtaining, from a second Radar located on the vehicle, a third sensor data item of the area that comprises the plurality of calibration objects;
determining, a second initial matrix by performing another pairwise calibration operation between the LiDAR sensor and the second camera using:
(1) the set of coordinates of the plurality of calibration objects determined from the second sensor data item for the LiDAR sensor, and
(2) a second radius and a second angle, for each calibration object, from the second Radar to the point on the plane of a calibration object determined from a third sensor data item for the second Radar.

18. The non-transitory computer readable storage medium of claim 17, wherein the method further comprises:
determining another updated matrix that describes another set of extrinsic parameters between the LiDAR sensor and the second Radar based at least on the second initial matrix and the location of at least one calibration object.

19. The non-transitory computer readable storage medium of claim 13, wherein the updated matrix is determined by using the factor graph that minimizes the summation of at least the first factor, the second factor, and a third matrix that represents a position and an orientation of the vehicle.

* * * * *